United States Patent [19]

Chuck

[11] 4,248,080
[45] Feb. 3, 1981

[54] WHEEL-MOUNTING TIRE PRESSURE GAGE WITH FAILSAFE FEATURES

[75] Inventor: Ted Chuck, Glendora, Calif.

[73] Assignee: HTL Industries, Inc., Arcadia, Calif.

[21] Appl. No.: 95,910

[22] Filed: Nov. 19, 1979

[51] Int. Cl.³ .................... G01L 17/00; B60C 23/04
[52] U.S. Cl. ................................. 73/146.8; 73/738
[58] Field of Search ............... 73/146.2, 146.3, 146.8, 73/738, 743; 137/227; 116/34 R

[56] References Cited

U.S. PATENT DOCUMENTS

| | | | |
|---|---|---|---|
| 3,335,610 | 8/1967 | Nelson | 73/738 |
| 3,938,393 | 2/1976 | Morgensen et al. | 73/738 |
| 3,969,936 | 7/1976 | Lindsay | 73/146.8 |

*Primary Examiner*—James J. Gill

*Attorney, Agent, or Firm*—Vincent G. Gioia; John K. Williamson

[57] ABSTRACT

A tire pressure gage for integral mounting on the wheel of an aircraft tire is provided with failsafe features to reduce the likelihood of sudden tire pressure loss through catastrophic failure of the gage. A pressure relief valve vents the case when the threshold pressure is sensed to thereby preclude long-term pressurization of the case should a slow leak develop in the bourdon tube of the gage. A flow-actuated valve in the port leading from the tire to the bourdon tube, seals the tire against pressure loss through the gage when a fast leak is detected such as might occur upon rupture of the tube. The pressure relief valve includes an ejectable plug normally visible externally of the gage case, the presence or absence of the plug providing a positive indication of whether or not the gage case has been pressurized.

9 Claims, 4 Drawing Figures

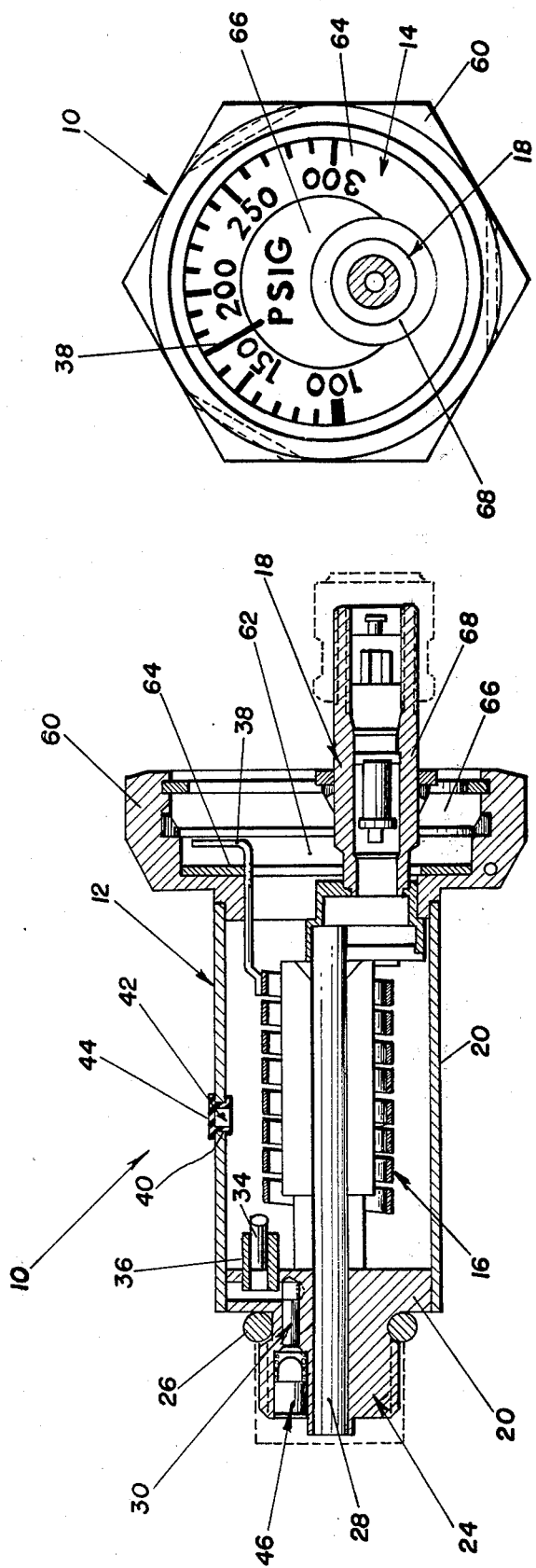

WHEEL-MOUNTING TIRE PRESSURE GAGE WITH FAILSAFE FEATURES

TECHNICAL FIELD

This invention relates to pressure gages in general, and more particularly concerns improvements in aircraft tire pressure gages of the type adapted to be fixedly attached to the supporting wheel of a pnematic tire.

BACKGROUND ART

Due to the critical importance of maintaining proper inflation pressures in the pneumatic tires of aircraft, it is the practice in the industry to provide each tire with its own pressure gage. Such gages are typically mounted in a well formed in the metal wheel which supports the pneumatic tire. In this manner, ground maintenance crews are provided with an accurate indication of the air pressure in each tire when performing routine service on the aircraft, and additionally can quickly and easily determine when the proper inflation pressure has been obtained in instances where it is necessary to inflate the tire.

The most common type of gage utilized for this purpose employs a coiled bourdon tube pressure sensor in combination with a conventional indicator dial readout. A sealed gage case surrounding the bourdon tube is constructed to withstand pressures in excess of the normal tire pressure in order to prevent loss of tire pressure in the event of a rupture or leak in the bourdon tube. The gage is normally provided with integral fill structure so that both gaging and filling operations can be accomplished via the same entry through the wheel to the interior of the tire.

If the bourdon tube in gages of this type should rupture, the tire pressure is maintained due to the sealed construction of the gage case as mentioned hereinabove. In such instances, maintenance crews are appraised of the gage failure because the indicator dial will show greatly reduced or no pressure even though the tire is fully inflated; the faulty gage is then simply replaced with a new one. However, in the much more common instance where the bourdon tube develops a relatively slow leak, the tire pressure will still be maintained at approximately the same level, but there may be no immediate indication that the gage is faulty. Under these circumstances, the gage may indicate a low-pressure reading when, in fact, the tire is properly inflated, so that as a consequence a ground maintenance worker may be misled into over inflating the tire. Perhaps of more critical concern, is the fact that the gage case can become partially pressurized for what may be an extended period of time, which, in turn, could result in blowout of the gage case, concurrent rupture of the bourdon tube, and appurtenant catastrophic loss of tire pressure.

DISCLOSURE OF INVENTION

The tire gage of the present invention is intended to overcome the potential problems associated with a slow leak from the bourdon tube in prior art gages, while at the same time providing improved protection against loss of tire pressure upon sudden rupture of the bourdon tube.

The conventional pressure port which extends through the gage case to place the bourdon tube in flow communication with the interior of the pneumatic tire is provided with a flow-actuated poppet valve in the present invention. At normal flow rates between the pneumatic tire and the bourdon tube, as would be encountered upon filling of the tire, the poppet valve remains in an open position to maintain fluid communication between the bourdon tube and the tire. However, when the flow rate from the tire to the tube exceeds a predetermined rate, such as for example that which might be encountered upon sudden rupture of the tube, the poppet valve closes thereby obstructing the flow path from the tire to the tube and precluding further loss of tire pressure.

In preferred forms, the gage case is provided with a vent hole leading from the interior of the case to the atmosphere. The vent hole is normally sealed by an ejectable, resilient plug which is adapted to be displaced from the vent when a temperature dependent, predetermined pressure is reached in the gage case. In certain low temperature ranges, the plug becomes substantially rigid to withstand pressures in the gage case in excess of the normal inflation pressure of the pneumatic tire. In normal temperature ranges, the resiliency of the plug is such that it will be unseated at pressures below the minimum inflation pressure of the tire. The absence of the resilient plug from its seated position in the vent indicates to maintenance personnel that a slow leak has developed in the gage and that accordingly it should be replaced.

A final feature of the invention is that the gage case itself is sufficiently strong to withstand the maximum tire pressure that could be expected to be encountered under normal operation of the aircraft. While such construction per se is known in the art as explained hereinabove, the combination of this construction with the unique plug-sealed vent and flow actuated poppet valve is an important aspect of the invention. In this regard, the elements of this invention cooperate to provide a virtually failsafe gage under all types of operating conditions and environments.

BRIEF DESCRIPTION OF THE DRAWINGS

FIG. 1 is an axial cross-sectional view of a tire pressure gage constructed in accordance with the principles of the present invention;

FIG. 2 is a front view of the gage;

FIG. 3 is an enlarged, fragmentary, cross-sectional view showing the poppet valve in its closed position; and FIG. 4 is an enlarged, fragmentary, cross-sectional view showing the plug displaced from the case vent.

BEST MODE FOR CARRYING OUT THE INVENTION

In FIG. 1 there is shown a gage 10 comprising a hollow metal case 12 of welded construction, an indicator assembly 14 at one end of the case 12, and a bourdon tube 16 supported within the case 12 in cooperating relation to the assembly 14. In preferred forms, the gage 10 is provided with integral fill structure 18 the construction of which is well known in the art.

The case 12 is generally cylindrical having an annular sidewall 20 extending between a mounting end wall 22 forming one end of the case and the indicator assembly 14 at the opposite end. The end wall 22 is provided with a threaded cylindrical boss 24 co-axial with the sidewall 20, for matingly engaging a gage-securing threaded aperture typically provided in the wheel of a pneumatic tire for an aircraft. An O-ring 26 is provided at the base of the boss 24 for effecting a fluid tight seal between the gage 10 and aircraft wheel when the two are mated.

A central passage 28 forming part of the fill structure 18 extends through the end wall 22 to provide a flow path into the interior of the pneumatic tire. The end wall 22 also has a pressure port 30 extending therethrough in sealed fluid communication with the bourdon tube 16 as will be described, such that there is provided a fluid communication path between the tube 16 and the interior of the tire.

The bourdon tube 16 is helical in configuration having a series of coaxial, equi-diameter, interconnected tubular coils 32 of uniform oblate cross section. The last coil 32 in the series has a sealed free end while the free end of the first coil 32 in the series is provided with an inlet segment 34 for attachment in an appropriate manner to a nipple 36 at the interior end of the port 30 to form a seal between the latter and the tube 16. It will be appreciated that as the tube 16 is pressurized, the coils 32 will exhibit a characteristic tendency to unwind such that the free end of the coil 32 may experience appreciable angular displacement relative to the inlet segment 34. An indicator needle 38 which forms a part of the indicator assembly 14 is attached to the coil 32 in the manner shown in FIG. 1 for translating the angular displacement of the coil to a corresponding pressure reading as will be described. In the preferred embodiment, the coils 32 of the tube 16 are supported in coaxial relation relative to the sidewall 20 of the case 12.

To avoid long-term pressurization of the case 12, as when a slow leak develops in the tube 16, there is provided a pressure relief valve constructed as follows. A vent 40 extends radially through the sidewall 20 intermediate the indicator assembly 14 and the end wall 22. A resilient elastomer plug 42 is adapted to be complementally received within the vent 40 for sealing of the latter as is shown, for example, in FIG. 1. Referring now to FIG. 4, it is seen that the plug 44 is generally cylindrical in shape having a pair of opposed annular flanges 44 adapted to captively engage the sidewall 20 therebetween when the plug 42 is seated in the vent 40. Manifestly, the plug 42 must be elastically deformed to effect seating and unseating with the vent 40. The pressure required to unseat the plug 40 at any given temperature may depend upon the material selected for the plug 40; in the preferred embodiment, the plug 40 is constructed to unseat at pressures of 50 psi or less at temperatures above 0° C.

A flow-actuated poppet valve 46 is provided in the port 30 for limiting the rate of flow through the latter to the tube 16. The valve 46 comprises a cylindrical bore 48 formed in the end wall 22, a valve seat 50 at one end of the bore 48, and a Teflon TFE fluorocarbon cylindrical plunger 52 complementally received within the bore 48 for shifting movement toward and away from the valve seat 50. A closure member 54 carried on the plunger 52 is adapated to mate with the valve seat 50 to close off the port 30 when the plunger 52 is biased toward the seat 50. A compression spring 56 operates to normally bias the plunger 52 away from the seat 50 (to the left as shown in FIG. 3) such that the valve 46 is maintained in a normally opened position. There is provided a retainer ring 58 for captively holding the plunger 52 within the bore 48.

The diameter of the plunger 52 is somewhat smaller than the diameter of the bore 48 to permit fluid flow at limited rates through the port 30. In this regard, it will be appreciated that if the flow rate through the port 30 to the tube 16 exceeds a certain threshold value, the pressure differential required to create such flow will be sufficiently great to shift the plunger 52 toward the seat 50 against the bias of the spring 56 thereby closing the valve 46 and precluding further fluid flow through the port 30 to the tube 16. Once seated, the plunger 52 is maintained in the closed position by the air pressure in the aircraft tire. As will be discussed hereinbelow, this operation is an important feature of the present invention.

The indicator assembly 14 is of generally conventional construction having a hexagonal body which defines a central cavity 52, a pressure dial 64 disposed within the cavity 62 in cooperating relation to the indicator needle 38 mounted on the bourdon tube 16, and a transparent crystal 66 sealingly mounted over the outermost end of cavity 62 in the manner shown, for example, in FIG. 1. In the preferred embodiment, the fill stem 68 of the fill structure 18 extends through the crystal 66 and is provided with appropriate sealing means for maintaining the sealed closure of the cavity 62. The body 60 is securely attached to the case 12 preferably by welding to form a fluid tight seal therewith such that the only fluid paths into and out of the case 12 are defined by the port 30 (when the valve 46 is in its open position) and the vent 40 (when the plug 42 is displaced from its seated position). As shown in FIG. 2, the dial 64 is provided with appropriate pressure graduations calibrated to the pressure response of the bourdon tube 16 such that the indicator needle 38 normally reads the gage pressure which is present in the aircraft tire.

INDUSTRIAL APPLICABILITY

As explained hereinabove, the gage 10 is intended as a failsafe device against the possibility of catastrophic aircraft tire pressure loss upon failure of the tire pressure gage. When the gage 10 is positioned upon the wheel of a pneumatic tire on an aircraft, the indicator assembly 14 normally provides an accurate reading of the pressure in the tire. Should the tire pressure fall below an accepted range, the ground maintenance personnel are apprised of this fact by a simple reading of the gage, and the situation may be readily corrected by inflating the tire to recommended pressures. During normal operation of the gage 10, the failsafe features of the invention play only a passive role, it being particularly noted that the poppet valve 46 permits sufficient flow through the port 30 to the tube 16 to provide a normal gage response during filling of the aircraft tire.

Should a failure in the bourdon tube 16 of the gage 10 occur, the failsafe features operate to maintain pressure in the aircraft tire while at the same time providing positive indication to maintenance personnel that the gage has failed. If, for example, the tube 16 should catastrophically fail as by bursting, the rapid increase in flow from the pressurized tire through the port 30 to the tube 16 will cause valve 46 to close thereby precluding further pressure loss from the tire through the port 30. Ground maintenance personnel will be apprised of the gage failure upon reading the indicator assembly 14 because the needle 38 will show no pressure reading.

In the much more likely instance where the bourdon tube 16 develops a small leak resulting in gradual pressure loss in the aircraft tire, the case 12 will become pressurized and ultimately the plug 42 will be blown from its seated position in the vent 40. Of course, once the plug 42 is unseated, the slow leak in the tube 16 will be vented to the atmosphere; however, maintenance personnel will be apprised of the faulty gage when they discover that the plug 42 is no longer in its normal seated position. Hence, gages which develop slow leaks may be readily identified and replaced before a catastrophic failure of the gage can result.

It has been found that by appropriate selection of the material for the plug 42, the latter will remain seated in the vent 40 under the colder temperature conditions normally encountered in flight, so that if the bourdon tube 16 develops a slow leak in flight, the vent 40 will not be opened until warmer temperatures are encountered upon landing. Such a result is possible because the resiliency of elastomer materials characteristically decreases with decreasing temperature, thereby requiring increased pressure to deform the plug 42 sufficiently to unseat it from the vent 40. Thus, there is provided the added safety feature that tire pressure loss will not occur when a slow leak develops in the gage during flight. Of course, as previously mentioned, the case 12 is constructed in the manner of conventional gage cases such that it is sufficiently strong to contain pressures in the range normally found in aircraft tires.

Accordingly, it is clear that the present invention represents a significant improvement over prior art gages. The gage 10 not only provides a simple and accurate means of monitoring aircraft tire pressure, it additionally has failsafe features which substantially reduce the likelihood of tire pressure loss due to catastrophic failure of the gage.

I claim:

1. In an aircraft tire pressure gage having a bourdon tube for sensing air pressure in the tire, a sealed case surrounding the bourdon tube, and a pressure port in said case for establishing a fluid communication path between said tube and said tire when the gage is in pressure measuring relation to the tire, the improvement comprising:

a pressure relief valve in said case for venting the latter to the atmosphere when pressure in the case exceeds a predetermined valve, said relief valve having means visible externally of the case for indicating whether or not the case has been vented; and a flow-actuated valve in said port for occluding said fluid communication path when airflow from the tire to the tube exceeds a preselected rate, whereby to preclude venting of the tire through the case should the tube rupture or otherwise develop a fast leak into the case.

2. The invention of claim 1 wherein said relief valve comprises a vent in said case extending from the interior thereof to the atmosphere, and an ejectable, resilient seal plug normally seated in said vent, said plug have a portion thereof visible externally of the case when seated in said vent.

3. The invention of claim 2 wherein said plug is constructed of an elastomer material exhibiting a temperature-variable resiliency, the pressure in said case required to eject said plug from the vent being below 50 psi when the temperature of said plug is greater than 0° C.

4. The invention of claim 2, said case being generally cylindrical, said vent extending radially through the sidewall of the case.

5. The invention of claim 2, said case being of sealed construction capable of withstanding internal pressures in excess the maximum expected tire pressure when said vent is closed.

6. The invention of claim 1, said flow-actuated valve comprising a bore formed in said case coincident with a portion of said port, a valve seat at one end of said bore and a seal plunger complementally received within said bore for movement to and from a port-sealing position against said seat.

7. The invention of claim 6, said flow-actuating valve having a spring normally biasing said plunger away from said port-sealing position.

8. The invention of claim 7, the maximum transverse cross-sectional area presented by said plunger being less than the minimum transverse cross-sectional area of said bore to permit limited airflow through the flow-actuated valve.

9. The invention of claim 6, said flow-actuated valve being disposed at the outer end of said port.

* * * * *